(12) United States Patent
Aggas

(10) Patent No.: US 6,497,931 B1
(45) Date of Patent: Dec. 24, 2002

(54) VACUUM IG UNIT WITH COLORED SPACERS

(75) Inventor: Steven L. Aggas, Pinckney, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/481,325

(22) Filed: Jan. 11, 2000

(51) Int. Cl.[7] ............................... E06B 3/24; E04C 2/54
(52) U.S. Cl. ....................................... 428/34; 52/786.13
(58) Field of Search .............................. 428/68, 76, 34, 428/120, 192, 207, 432, 433, 434, 469, 470, 471, 472; 52/786.1, 786.13

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,892,726 A | 6/1959 | Smith et al. |
| 2,962,409 A | 11/1960 | Ludlow et al. |
| 3,296,004 A | 1/1967 | Duncan |
| 3,441,924 A | 4/1969 | Peek et al. |
| 3,723,142 A | 3/1973 | Kato et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,478,905 A | 10/1984 | Neely, Jr. |
| 4,487,482 A | 12/1984 | Kobayashi et al. |
| 4,514,450 A | 4/1985 | Nowobilski et al. |
| 4,683,154 A | 7/1987 | Benson et al. |

(List continued on next page.)

FOREIGN PATENT DOCUMENTS

| | | | |
|---|---|---|---|
| EP | 0047725 | * | 3/1982 |
| FR | 2 482 161 | | 11/1981 |
| FR | 2 752 012 | | 2/1998 |

OTHER PUBLICATIONS

International Search Report, Mar. 26, 2001.
Simko et al, "Temperature–Induced Stresses in Vacuum Glazing: Modelling and Experimental Validation", *Solar Energy*, vol. 63, No. 1, pp. 1–21, 1998.
Griffiths et al, "Fabrication of Evacuated Glazing at Low Temperature", *Solar Energy*, vol. 63, No. 4, pp. 243–249 (1998).
Lenzen et al, "Thermal Outgassing of Vacuum Glazing".
Collins et al, "Current Status of the Science and Technology of Vacuum Glazing", *Solar Energy*, vol. 62, No. 3, pp. 189–213 (1998).

*Primary Examiner*—Donald J. Loney
(74) *Attorney, Agent, or Firm*—Nixon & Vanderhye P.C.

(57) ABSTRACT

A vacuum insulating glass (IG) unit. Spacers between the substrates are colored (e.g. color tinted) so as to more closely match a color of either a substrate(s) or a low-E coating provided on one of the substrates.

13 Claims, 3 Drawing Sheets

U.S. PATENT DOCUMENTS

| | | |
|---|---|---|
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,069,826 A | 12/1991 | Cheng |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,557,462 A | 9/1996 | Hartig et al. |
| 5,596,981 A | 1/1997 | Soucy |
| 5,657,607 A | 8/1997 | Collins et al. |
| 5,664,395 A | 9/1997 | Collins et al. |
| 5,689,930 A * | 11/1997 | Anderson et al. ........ 52/786.11 |
| 5,739,882 A | 4/1998 | Shimizu et al. |
| 5,837,108 A | 11/1998 | Lingle et al. |
| 5,855,638 A | 1/1999 | Demars |
| 5,891,536 A | 4/1999 | Collins et al. |
| 5,902,652 A | 5/1999 | Collins et al. |
| 5,932,502 A | 8/1999 | Longobardo et al. |
| 6,049,370 A | 4/2000 | Smith, Jr. et al. |

* cited by examiner

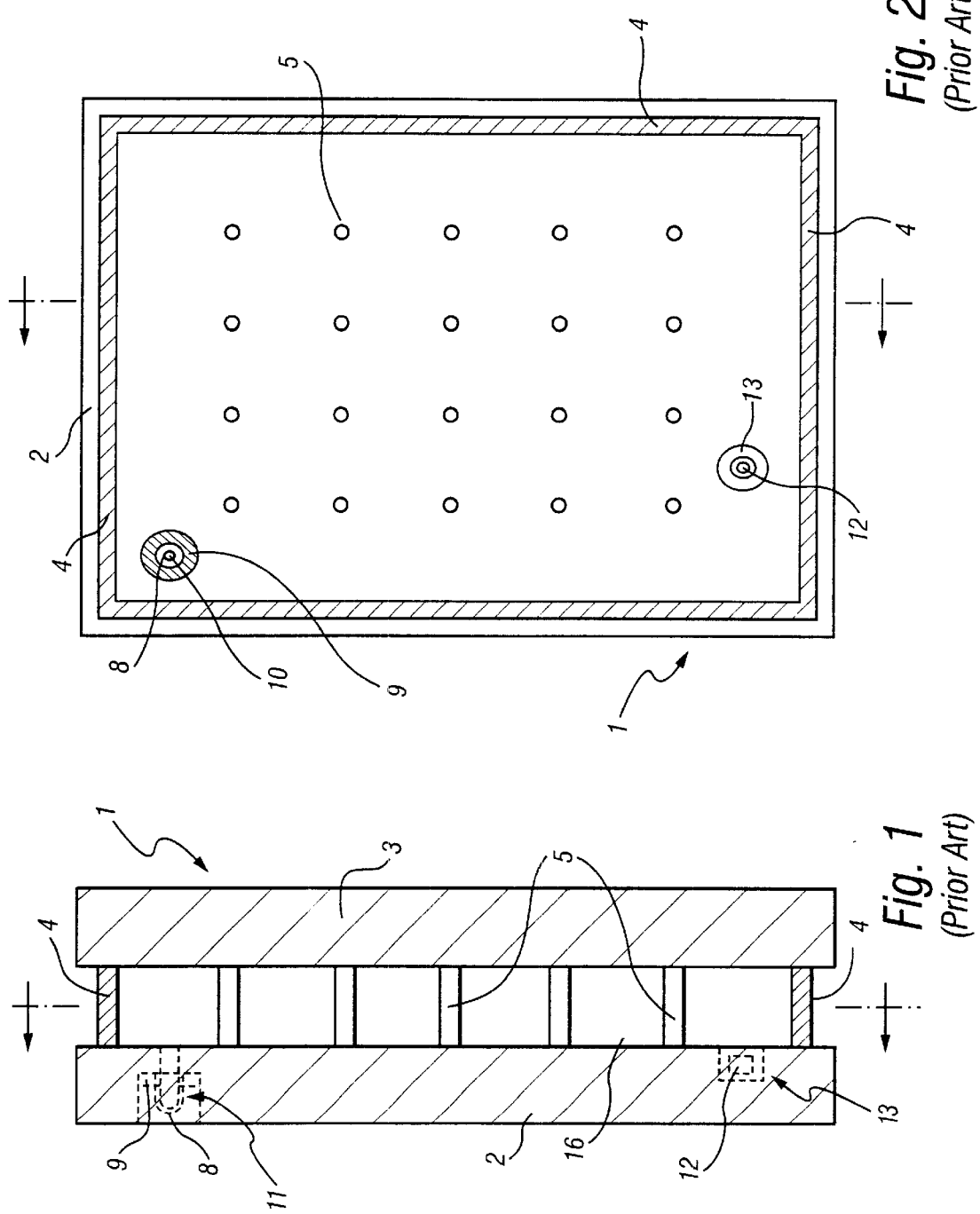

VACUUM IG UNIT WITH COLORED SPACERS

This invention relates to a vacuum insulating glass (IG) unit. More particularly, this invention relates to a vacuum IG unit including at least one colored spacer/pillar.

RELATED APPLICATIONS

Commonly owned U.S. Ser. Nos. 09/348,281 entitled "PERIPHERAL SEAL FOR VACUUM IG WINDOW UNIT" filed Jul. 7, 1999 (now U.S. Pat. No. 6,365,242); Ser. No. 09/303,550 entitled "VACUUM IG PILLAR WITH DLC COATING" filed May 3, 1999 (now U.S. Pat. No. 6,326,067); Ser. No. 09/404,659 filed Sep. 24, 1999 entitled "VACUUM IG WINDOW UNIT WITH PERIPHERAL SEAL AT LEAST PARTIALLY DIFFUSED AT TEMPER" (now U.S. Pat. No. 6,336,984); Ser. No. 09/440,697 filed Nov. 16, 1999 entitled "VACUUM IG WINDOW UNIT WITH FIBER SPACERS"; and Ser. No. 09/480,895 filed simultaneously herewith entitled "VACUUM IG UNIT WITH ALKALI SILICATE EDGE SEAL AND/OR SPACERS, are all hereby incorporated herein by reference.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 16 therebetween. Glass sheets 2 and 3 are interconnected by peripheral or edge seal of fused solder glass 4 and have an array of support spacers/pillars 5 therebetween.

Pump out tube 8 is sealed by solder glass 9 to an aperture or hole which passes from an interior surface of glass sheet 2 to the bottom of recess 11. A vacuum is attached to tube 8 (prior to the tube being sealed) so that the interior space 16 between sheets 2 and 3 can be evacuated to create a low pressure area. After evacuation, an end of tube 8 is melted to seal the vacuum in space 16. Optionally, getter 12 may be provided within recess 13 to counteract any rise in pressure due to any out-gassing from the glass.

FIG. 3 is a side cross sectional view of another conventional vacuum IG window unit. This unit differs from the FIGS. 1–2 unit, in that its glass sheets are of different sizes so as to provide an L-shaped step around the unit's periphery, on which edge seal 4 is to be at least partially located. Moreover, this unit includes low-E coating 6 on the interior major surface of glass sheet 3.

Low-E coatings often appear colored (e.g. color tinted) to a viewer. For example, see U.S. Pat. No. 5,557,462 (hereby incorporated herein by reference) which discloses a low-E coating having a colored appearance which may be "slightly blue." Moreover, known soda-lime-silica glass sheets may also appear colored (e.g. green, rose, blue, and bronze colored glass sheets are known). For examples of colored glass, see U.S. Pat. Nos. 5,932,502, 5,069,826, 3,723,142, 3,296,004, and 2,524,719, all of which are hereby incorporated herein by reference.

As illustrated in FIGS. 1–3, spacers or pillars 5 are typically provided between glass sheets 2 and 3 in the viewing area of the window unit. As discussed in U.S. Pat. No. 5,664,395, these spacers or pillars may be made of nickel, iron, molybdenum, tungsten, tantalum, titanium, aluminum, steel or stainless alloys. They may also be made of glass as discussed in U.S. Pat. No. 4,683,154. Unfortunately, because spacers/pillars are often significantly different in appearance (e.g. differently colored) relative to adjacent low-E coating(s) and/or glass substrate(s), they may be considered an eyesore (i.e., aesthetically non-pleasing) to certain persons viewing a window. In other words, because of the stark contrast in appearance between, for example a steel spacer and a blue tinted glass sheet, the spacer is easily seen by one looking through the window.

It is apparent from the above that there exists a need in the art for a vacuum IG unit in which spacers/pillars more closely match adjacent coating(s) and/or substrate(s) in appearance.

This invention will now be described with respect to certain embodiments thereof, accompanied by certain illustrations.

SUMMARY OF THE INVENTION

An object of this invention is to provide at least one spacer/pillar in a vacuum IG window unit, the spacer being tinted in color in order to more closely match a color of an adjacent low-E coating(s) and/or an adjacent glass substrate(s).

Another object of this invention is to provide a vacuum IG window unit wherein spacers of the unit include colorant(s) therein so as to substantially match in color an adjacent low-E coating and/or glass substrate.

Another object of this invention is to provide a vacuum IG window unit including spacers which are colored so as to render them less visibly obtrusive to one viewing the window unit.

Another object of this invention is to fulfill any and/or all of the above-listed objects and/or needs.

Generally speaking, this invention fulfills any or all of the above described objects or needs by providing a method of making a thermally insulating panel, said method comprising the steps of:

providing first and second glass substrates;

providing a plurality of colored spacers between said substrates in order to maintain a low pressure space between said substrates; and selecting color of the colored spacers based upon color of at least one of (a) one of the substrates, and (b) a coating provided on one of said substrates.

This invention further fulfills any or all of the above described objects or needs by providing a thermally insulating glass panel comprising:

first and second spaced apart glass substrates defining a low pressure space therebetween having a pressure less than atmospheric pressure;

a coating having a color tint, said coating supported by a major surface of one of the glass substrates;

a plurality of spacers disposed between the first and second glass substrates for spacing the substrates from one another in order to maintain the low pressure space therebetween; and wherein at least one of the spacers includes a colorant therein so that the at least one spacer more closely matches in color the color tint of the coating.

IN THE DRAWINGS

FIG. 1 is a prior art side partial cross-sectional view of a conventional vacuum IG window unit.

FIG. 2 is a top partial cross-sectional view of the FIG. 1 vacuum IG unit, absent the top glass substrate.

DETAILED DESCRIPTION OF CERTAIN EMBODIMENTS OF THIS INVENTION

Figure 3:
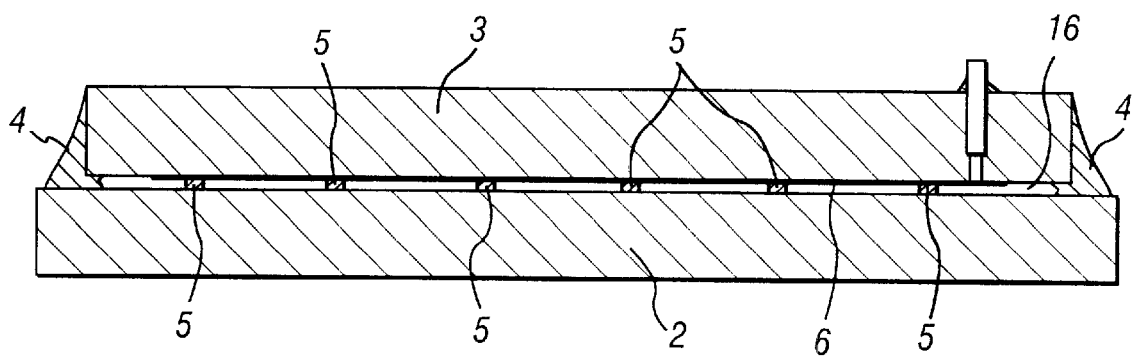
FIG. 3 is a side cross-sectional view of another conventional vacuum IG window unit, including a low-E coating on a major interior surface of one of the substrates.

Referring now more particularly to the accompanying drawings in which like reference numerals indicate like parts throughout the several views.

Certain embodiments of this invention relate to an improved vacuum IG window unit including spacers/pillars which are colored or tinted in a manner so as to render them less visibly obtrusive than conventional spacers to one viewing the window unit. By adding a particular colorant(s) or tint(s) material to a spacer, the spacer may be caused to more closely blend in visually with an adjacent colored/tinted low-E coating(s) and/or an adjacent colored/tinted glass substrate(s). Accordingly, contrast between the spacer(s) and the adjacent coating(s) and/or substrate(s) is reduced or minimized under normal background viewing conditions, so that the overall vacuum IG unit is more aesthetically pleasing.

Figure 4:
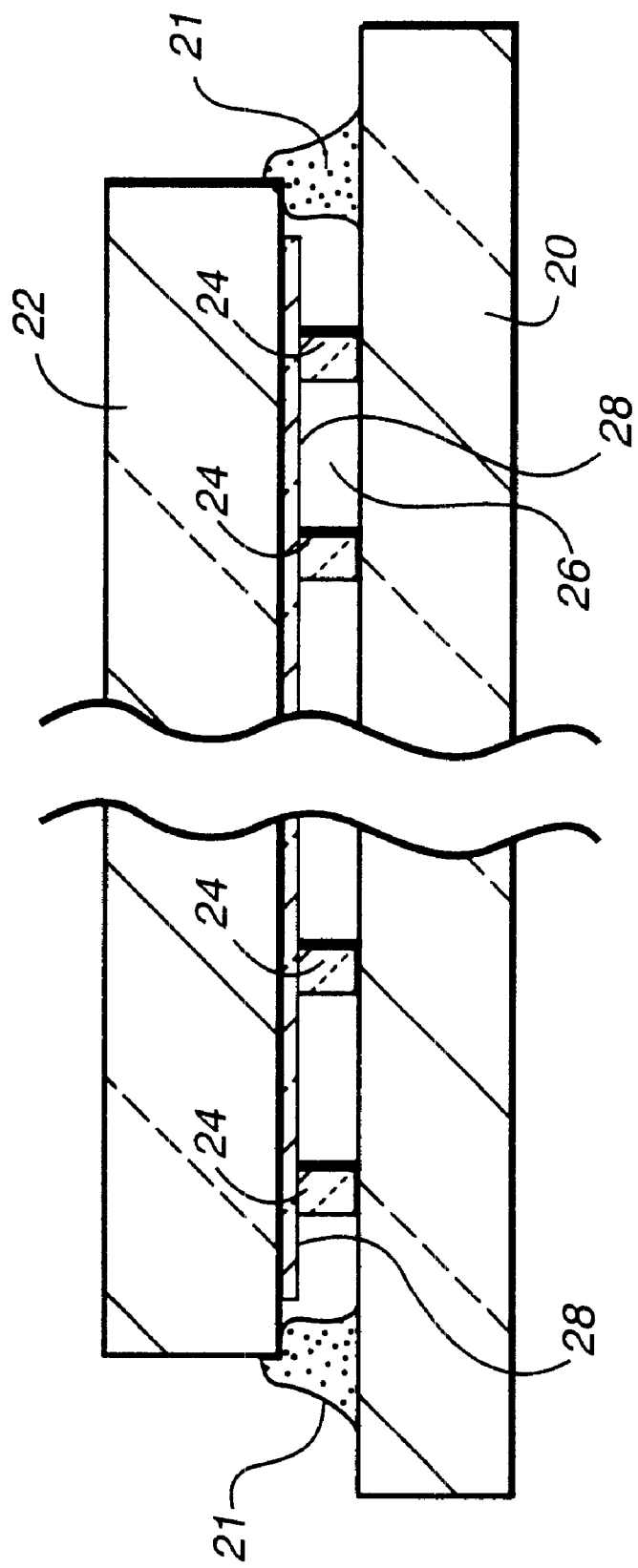
FIG. 4 is a side cross-sectional view of a vacuum IG window unit including colored spacers according to an embodiment of this invention.

Herein, edges of opposing vacuum IG substrates are hermetically sealed by at least one edge or peripheral seal (e.g., see reference numeral 4 in FIGS. 1–3 and reference numeral 21 in FIG. 4). As can be seen in the drawings, "peripheral" and "edge" seals herein do not mean that the seal(s) are located at the absolute periphery or edge of the unit, but instead mean that the seal is at least partially located at or near (e.g., within about two inches of) an edge of at least one substrate of the unit.

FIG. 4 illustrates an exemplary vacuum IG window unit according to an embodiment of this invention. The vacuum IG window unit includes first and second opposing glass substrates 20 and 22 (tempered or non-tempered) which are spaced from one another by colored (e.g. tinted) spacers or pillars 24 which maintain low pressure space 26 between the substrates. In certain embodiments, coating 28 (e.g. a low-E coating or any other type of colored/tinted coating that may be placed on a glass substrate) may be provided on a major surface (inner or outer major surface) of one or both of glass substrates 20, 22. In certain preferred embodiments, substrates 20 and 22 are soda-lime-silica inclusive float glass which may or may not be colored or tinted according to different embodiments of this invention. Hermetic peripheral or edge seal 21, provided at least partially between substrates 20 and 22, seals off low pressure space 26 from surrounding atmospheric pressure. In the FIG. 4 embodiment, the peripheral/edge seal 21 is located only partially between the opposing substrates 20 and 22. However, in other embodiments, seal may be disposed entirely between the opposing substrates. In either case, seal 21 is "between" the opposing substrates. Hermetic seal 21 may be made of or include solder glass, alkali silicate (e.g. sodium or potassium silicate), indium, or any other suitable material.

Vacuum IG units according to different embodiments of this invention may be used as residential or commercial windows. The evacuation of space 26 eliminates or reduces heat transport between glass substrates 20 and 22 due to gaseous conduction and convection. In addition, radiative heat transport between substrates 20 and 22 can be reduced to a low level by providing a low emittance or emissivity (low-E) coating 28 on a major surface of one or both of sheets 20, 22. High levels of thermal insulation can thus be achieved. Low gaseous thermal conduction may be achieved when the pressure in space 26 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system(s) 21, including one or more edge seals, substantially eliminates any ingress or outgress of gas or air to/from low pressure space 26.

Coating(s) 28 may be, for example, a low-E coating, an IR-reflective coating, a UV reflective coating, and/or any other type of desired glass coating. For example, coating 28 may take the form of any low-E coating system disclosed in any of commonly owned U.S. Pat. Nos. 5,837,108, 5,800,933, 5,770,321, 5,557,462 or 5,344,718, the disclosures of which are all hereby incorporated herein by reference. Alternatively, coating 28 may take the form of any low-E coating commercially available from the assignee of this invention, Guardian Industries Corp., Auburn Hills, Mich. Many such coatings 28 are colored or slightly tinted from a visual perspective. For example, the aforesaid '462 Patent discloses a coating including an IR (infrared) reflecting layer comprising Ag provided between silicon nitride dielectric layers. Contact layers of NiCr may be provided between the IR reflecting layer and each dielectric layer in the '462 Patent. As another example, the aforesaid '108 Patent discloses a coating including a NiCr IR reflecting layer provided between a pair of nitride dielectric layers. For example, coating 28 may be blue tinted as disclosed in the '462 patent, or may be green tinted, or may be colored in any other desired manner.

Glass substrates 20, 22 (e.g. soda-lime-silica based glass) may also be colored or tinted in certain embodiments of this invention. For example, one or both of glass substrates 20, 22 may be any of the green colored/tinted soda-lime-silica glasses disclosed in commonly owned U.S. Pat. No. 5,214,008 (the disclosure of which is hereby incorporated herein by reference), any of the grey soda-lime-silica glasses disclosed in commonly owned U.S. Pat. No. 5,932,502 (the disclosure of which is hereby incorporated herein by reference), or any of the colored glasses disclosed in any of U.S. Pat. Nos. 4,110,245 or 5,036,025, both hereby incorporated herein by reference. In other embodiments, one or both of substrates 20, 22 may be any of the commercially available glasses available from the assignee of this invention, Guardian Industries Corp., Auburn Hills, Mich. Thus, glass substrates 20, 22 may be colored green, blue, or any other desired color in different embodiments of this invention. While glass substrates 20, 22 are colored/tinted in certain embodiments of this invention, this need not be the case in all embodiments.

While substrates 20, 22 and/or coating 28 are referred to herein as colored, it is noted that they are provided in a viewing area of a window unit. Thus, while they may be color tinted, they still can be seen through with the naked eye of a viewer looking through the vacuum IG window unit. Thus, for example, certain colored substrates 20, 22 and/or coatings 28 herein have visible light transmission characteristics of at least about 40%, more preferably of at least about 60%, and most preferably of at least about 70%.

Referring to FIG. 4, an array of spacers or pillars 24 is provided between substrates 20 and 22 in order to maintain separation of the two approximately parallel glass sheets against atmospheric pressure. In certain embodiments, each spacer/pillar may have a height of from about 0.10 to 0.60 mm. Spacers or pillars 24 may take any suitable shape. For examples, spacers or pillars 24 may be spherical, cylindrical, square, rectangular, rod-like, bead-like, oval, trapezoidal, or the like. Moreover, in other embodiments, spacers/pillars 24 may be shaped as illustrated in any embodiment of U.S. Pat. No. 5,891,536. Spacers 24 may be made of or include solder glass, glass, alkali silicate, ceramic, glass fiber(s), sapphire, any material disclosed in the '536 patent, or any other suitable material. In certain embodiments, all spacers 24 are of approximately the same size and/or material. However, in other embodiments, there may be different sizes of spacers 24 in the same vacuum IG unit. In certain embodiments, the density of spacers (i.e., the number of spacers per unit area) may be greater in certain areas than in other areas, or alternatively, the density of the spacers may be approximately uniform throughout the entire unit.

In accordance with certain embodiments of this invention, spacers 24 are colored in a manner so that they substantially match in color the color (e.g. tint) of either coating 28 or the color (e.g. tint) of at least one of substrates 20, 22. For example, in an exemplary embodiment where substrates 20, 22 are substantially neutral in color or non-colored and coating 28 is blue tinted, then a plurality of spacers 24 are tinted blue in color so as to more closely resemble the color of the overall vacuum IG unit as viewed by a viewer. In another exemplary embodiment where substrates 20, 22 and coating 28 are blue tinted in color, spacers 24 are also blue tinted in color so as to more closely resemble the color of the overall unit as viewed by a viewer. In another exemplary embodiment where at least one of substrates 20, 22 is green tinted in color and no coating 28 is provided, spacers 24 are green tinted in color so as to more closely resemble the color of the overall unit as viewed by a viewer.

In certain preferred embodiments, the color of spacers 24 substantially matches the color of an adjacent color tinted coating 28 or the color of an adjacent color tinted substrate 20, 22. However, in other embodiments, the color of the tinted spacers need not substantially match the color of the adjacent coating 28 or substrate, but instead need only be in the same general color range. For example, when clear substrates 20, 22 are provided and a blue tinted low-E coating 28 is on one of the substrates, spacers 24 need only be blue tinted (i.e. the exact shade of blue for the spacers need not substantially match the blue tint color of the coating) in order to reduce the visually perceivable contrast between the spacers 24 and the rest of the window unit. In other words, while substantial matching of color is preferred, it is not necessary and is not always economically feasible in certain applications.

For purposes of example only, an example of how spacers 24 may be colored or tinted is discussed below when the spacers are made of or include an alkali silicate (e.g. sodium silicate, potassium silicate, etc.). Such material is also known by some as "liquid glass." The spacer material is initially deposited or otherwise provided in a plurality of discrete locations on one of substrates 20, 22 in aqueous solution form (e.g. alkali silicate plus water). Thereafter, the substrates and solution are together heated to a curing temperature of no greater than about 300° C. (more preferably no greater than about 225° C., and most preferably no greater than about 150° C.) for a period of time of from about 0.25 to 5.0 hours so as to allow the water of the solution to evaporate thereby causing the spacer material to cure or crystallize into solid glass spacers 24. In certain preferred embodiments, the curing temperature is from about 40° to 150° C., more preferably from about 50° to 120° C. For example, in certain embodiments, the spacers may be cured at about 60° C. for about three hours, or alternatively may be cured at about 100° C. for about one hour. The cure time is a function of the cure temperature, and vice versa.

In certain preferred embodiments, spacers 24 may be of or include $Na_2O$—$MSiO_2$ (i.e. a form of sodium silicate) or alternatively may be of or include $K_2O$—$MSiO_2$ (i.e. a form of potassium silicate), where "M" represents a modulus of glass and may be from about 1.0 to 5.0 (more preferably from about 2.5 to 3.5, and most preferably about 3.0). In other words, with reference to $Na_2O$—$MSiO_2$ for example, the ratio by weight of $Na_2O:SiO_2$ (sodium oxide to silica ratio) may be from about 1:1 to about 1:5, more preferably from about 1:2.5 to 1:3.5, and most preferably about 1:3. While the term "sodium silicate" is used herein, this term is not limited to only $Na_2O$—$MSiO_2$, but includes, for example without limitation, sodium orthosilicate, sodium tetrasilicate, sodium metasilicate, sodium silicate, $Na_4O_4$—$MSiO_2$(or Si), $Na_2O$—$MSiO_3$, $Na_2$—$MSi_4O_9$, and other comparable silicates whether in dry or solution form. This is also true with regard to other silicate terms used herein, such as potassium silicate and alkali silicate.

As discussed above, the material for spacers 24 may be initially deposited or otherwise provided on one of substrates 20, 22. The initial viscosity of the solution when deposited is a function of the concentration C of the alkali silicate in water and of the value of M. For example, for $Na_2O$—$MSiO_2 \times H_2O$, (i) when M=3 and C=42%, the solution's viscosity is about 0.53 Pa·s (pascal per second), (ii) when M=2.5 and C=40%, the solution's viscosity is about 0.2 Pa·s, and (iii) when M=3 and C=42%, the solution's viscosity is about 0.2 Pa·s. In certain embodiments of this invention, the solution's initial viscosity when originally deposited on a glass substrate in aqueous form is from about 0.1 to 0.8 Pa·s, more preferably from about 0.15 to 0.6 Pa·s. The concentration "C" of alkali silicate, in water or other liquid carrier in the initially deposited aqueous solution, is preferably from about 30 to 50%, more preferably from about 35 to 45%, and most preferably from about 39 to 43%.

Conventional glass colorants may be added to (or provided in) the aqueous solution of alkali silicate in order to color (e.g. tint) the resulting glass spacers 24 as desired. Known glass colorants include cobalt (e.g. in the form of CoO or $Co_3O_4$) as a blue colorant, ferrous oxide (FeO) as a blue colorant, ferric oxide ($Fe_2O_3$) as a yellow colorant [iron (Fe) may thus be a green colorant as a function of the redox ratio between ferrous and ferric oxides], titanium (e.g. in the form of $TiO_2$) as a yellow colorant, chromium (e.g. in the form of $Cr_2O_3$) as a green colorant, and selenium (Se) as a pinkish colorant. Other colorants which may be added to the aqueous solution to be cured into spacers 24 include, for example without limitation, NiO, $MnO_2$, and $V_2O_5$.

For example, when it is desired to color tint spacers 24 a greenish color in order to more closely match the color of green tinted glass substrates 20, 22, green colorant(s) such as $Cr_2O_3$ and/or iron (Fe) may be added to the aqueous solution of alkali silicate and water prior to its being applied in segments on the substrate. By weight, such colorant(s) may represent from about 0.01% to 2.00% of the resulting cured spacer material, depending upon the ultimate color and shade thereof desired for the spacer. Upon curing, the solution segments form spacers 24 which are green tinted in color. Because both the spacers 24 and substrates 20, 22 are green tinted in color, the contrast between them is reduced and the vacuum IG window unit may be considered by some to be more aesthetically pleasing to view.

In another example, when it is desired to tint spacers 24 a bluish color in order to more closely match the color of a blue tinted low-E coating 28 on a clear substrate, blue colorant(s) such as CoO, $Co_3O_4$ and/or ferrous oxide (FeO) may be added to the aqueous solution of alkali silicate and water prior to its being applied in segments on the substrate. Upon curing, the solution segments form spacers 24 which are blue tinted in color. Because both the spacers 24 and coating 28 are blue tinted in color (substrates 20, 22 are clear in this example), the contrast between them is reduced and the vacuum IG window unit may be considered by some to be more aesthetically pleasing to view.

In certain alternative embodiments of this invention, spacers 24 need not be formed as discussed above via deposition of an alkali silicate aqueous solution and curing thereof. Instead, glass beads or fibers may be used as spacers 24. Again, conventional glass colorants (e.g., see above) may be included within such glass beads or fibers in order to color them as desired so that they may more closely match color(s) of adjacent coating(s) and/or substrate(s). In still further embodiments of this invention, spacers 24 need not be made of glass; but, instead, may be made of or include colored ceramic, metal alloy, or any other suitable material.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel window unit comprising:

first and second spaced apart glass substrates of the window unit defining a low pressure space therebetween having a pressure less than atmospheric pressure;

a coating having a color tint, said coating supported by a major surface of one of said glass substrates;

wherein said coating comprises at least one infrared (IR) reflecting layer comprising a material selected from Ag or NiCr, said IR reflecting layer provided between at least first and second dielectric layers of said coating;

a plurality of spacers disposed between said first and second glass substrates for spacing said substrates from one another in order to maintain said low pressure space therebetween;

a hermetic seal for sealing said low pressure space; and wherein at least one of said spacers includes a colorant therein so that said at least one spacer may more closely match in color said tint of said coating.

2. The glass panel of claim 1, wherein said at least one spacer comprises a material selected from sodium silicate or potassium silicate.

3. The glass panel of claim 1, wherein said colorant comprises at least one material selected from iron, chromium, titanium, selenium, nickel, cobalt, or manganese.

4. The glass panel of claim 1, wherein a color tint of said at least one spacer substantially matches said color tint of said coating.

5. The glass panel of claim 1, wherein said color tint of said coating is one of green tint and blue tint, and wherein said at least one spacer is one of green tinted and blue tinted.

6. The glass panel of claim 1, wherein said at least one spacer comprises a material selected from alkali silicate, sodium silicate, sodium orthosilicate, sodium tetrasilicate, sodium metasilicate, potassium silicate, potassium orthosilicate, potassium tetrasilicate, or potassium metasilicate.

7. The glass panel of claim 1, wherein said colorant is chosen based upon said color tint of said coating.

8. A window unit comprising:

first and second spaced apart glass substrates of the window unit defining a space therebetween having a pressure less than atmospheric pressure;

a plurality of spacers disposed between said substrates so as to maintain said space therebetween;

wherein a number of said spacers comprise at least one colorant and are color tinted in a manner such that colors of said number of said spacers more closely resemble a color of at least one of said substrates, than if said spacers were not color tinted; and wherein said number of spacers are of a material(s) different than material(s) of said glass substrates, and wherein the spacers are also of a material(s) different than material(s) of a coating provided between the spacers and one of the substrates.

9. The unit of claim 1, wherein said IR reflecting layer comprises Ag.

10. The unit of claim 1, wherein said IR reflecting layer comprises NiCr.

11. The unit of claim 1, wherein at least one of the dielectric layers comprises silicon nitride.

12. The unit of claim 1, wherein the coating comprises a layer comprising NiCr provided between the IR reflecting layer which comprises Ag and one of the dielectric layers.

13. An IG window unit comprising:

first and second spaced apart glass substrates of the window unit defining a space therebetween;

a coating having a color tint, said coating supported by a major surface of one of said glass substrates, wherein said coating comprises at least one infrared (IR) reflecting layer comprising a material selected from Ag or NiCr, said IR reflecting layer provided between at least first and second dielectric layers;

a plurality of spacers disposed between said first and second glass substrates for spacing said substrates from one another;

a seal for sealing said space; and wherein at least one of said spacers includes a colorant therein so that said at least one spacer may more closely match in color said tint of said coating.

* * * * *